United States Patent
Adachi et al.

(10) Patent No.: US 8,407,387 B2
(45) Date of Patent: Mar. 26, 2013

(54) MULTI-THREAD PROCESSOR AND THE MULTI-THREAD PROCESSOR'S INTERRUPT PROCESSING METHOD HAVING INTERRUPT PROCESSING THAT IS PROCESSED BY AN ASSOCIATED HARDWARE THREAD

(75) Inventors: Koji Adachi, Kanagawa (JP); Kazunori Miyamoto, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 217 days.

(21) Appl. No.: 12/585,818

(22) Filed: Sep. 25, 2009

(65) Prior Publication Data
US 2010/0082867 A1 Apr. 1, 2010

(30) Foreign Application Priority Data
Sep. 30, 2008 (JP) ................................ 2008-252235

(51) Int. Cl.
*G06F 13/14* (2006.01)
(52) U.S. Cl. ........................................ 710/264; 710/267
(58) Field of Classification Search ........... 710/260–269
See application file for complete search history.

(56) References Cited

U.S. PATENT DOCUMENTS

| | | | |
|---|---|---|---|
| 5,283,904 A | 2/1994 | Carson et al. | |
| 6,401,155 B1 * | 6/2002 | Saville et al. | 710/266 |
| 6,770,965 B2 * | 8/2004 | Takeuchi et al. | 257/700 |
| 6,954,922 B2 * | 10/2005 | Liang | 717/130 |
| 7,386,646 B2 * | 6/2008 | So et al. | 710/260 |
| 2004/0073910 A1 * | 4/2004 | Hokenek et al. | 719/310 |
| 2005/0102458 A1 * | 5/2005 | Ober et al. | 710/260 |
| 2006/0212687 A1 * | 9/2006 | Chen et al. | 712/228 |

FOREIGN PATENT DOCUMENTS

| | | |
|---|---|---|
| JP | 6-180688 A | 6/1994 |
| JP | 10-124316 A | 5/1998 |
| JP | 2006-146641 A | 6/2006 |

OTHER PUBLICATIONS

Notice for Reasons for Rejection dated Jul. 10, 2012, with English-language translation.

* cited by examiner

*Primary Examiner* — Raymond Phan
(74) *Attorney, Agent, or Firm* — McGinn IP Law Group, PLLC

(57) ABSTRACT

A first exemplary aspect of an embodiment of the present invention is a multi-thread processor including a plurality of hardware threads each of which generates an independent instruction flow, and an interrupt controller that determines whether or not an input interrupt request signal is associated with one or more than one of the plurality of hardware threads, and when the input interrupt request signal is associated, assigns the interrupt request to an associated hardware thread.

14 Claims, 7 Drawing Sheets

| FLAG | FLAG | FLAG | FLAG |
|---|---|---|---|
| THREAD 0 | THREAD 1 | THREAD 2 | THREAD 3 |

Fig. 7

MULTI-THREAD PROCESSOR AND THE MULTI-THREAD PROCESSOR'S INTERRUPT PROCESSING METHOD HAVING INTERRUPT PROCESSING THAT IS PROCESSED BY AN ASSOCIATED HARDWARE THREAD

BACKGROUND

1. Field of the Invention

The present invention relates to a multi-thread processor and its interrupt processing method.

2. Description of Related Art

In recent years, multi-thread processors have been proposed in order to improve the processing power of processors. A multi-thread processor has a plurality of hardware threads each of which generates an independent instruction flow. Further, the multi-thread processor performs arithmetic processing while changing the instruction flow to be processed in the arithmetic circuit that processes instructions in pipeline processing between a plurality of instruction flows that are generated by the respective plurality of hardware threads.

At this point, the multi-thread processor can execute an instruction generated by one hardware thread in one execution stage of the pipeline while executing an instruction generated by another hardware thread in another execution stage. That is, in the arithmetic circuit of the multi-thread processor, instructions that are independent of each other are executed in different execution stages from each other. In this way, the multi-thread processor can process each instruction flow smoothly while reducing the time period during which no instruction is processed in an execution stage of the pipeline, and thus improving the processing power of the processor.

Japanese Unexamined Patent Application Publication No. 2006-146641 discloses a technique in which when a second interruption occurs while a first interruption is being processed in a multi-thread processor, the second interrupt processing is assigned to a different hardware thread from the hardware thread executing the first interrupt processing.

SUMMARY

The present inventors have found a problem that in Japanese Unexamined Patent Application Publication No. 2006-146641, interruption requests are not associated with hardware threads. Therefore, an interruption request that requires strict time management, for example, cannot always be assigned to a predefined hardware thread that executes processing requiring strict time management, and therefore the overall reliability of the system could be impaired.

A first exemplary aspect of the present invention is a multi-thread processor including: a plurality of hardware threads each of which generates an independent instruction flow; and an interrupt controller that determines whether or not an input interrupt request signal is associated with one or more than one of the plurality of hardware threads, and when the input interrupt request signal is associated, assigns the interrupt request to an associated hardware thread.

Another exemplary aspect of the present invention is an interrupt processing method of a multi-thread processor having a plurality of hardware threads, including: determining whether or not an input interrupt request signal is associated with one or more than one of the plurality of hardware threads, and when the input interrupt request signal is associated, assigning the interrupt request to an associated hardware thread.

In accordance with an exemplary aspect of the present invention, interrupt processing is processed by a hardware thread associated with that interrupt processing, and thus enabling both higher processing power and higher reliability.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 7 is a schematic diagram illustrating a structure of a thread bind register corresponding to one channel in accordance with a second exemplary embodiment of the present invention.

DETAILED DESCRIPTION OF THE EXEMPLARY EMBODIMENTS

[First Exemplary Embodiment]

Figure 1:
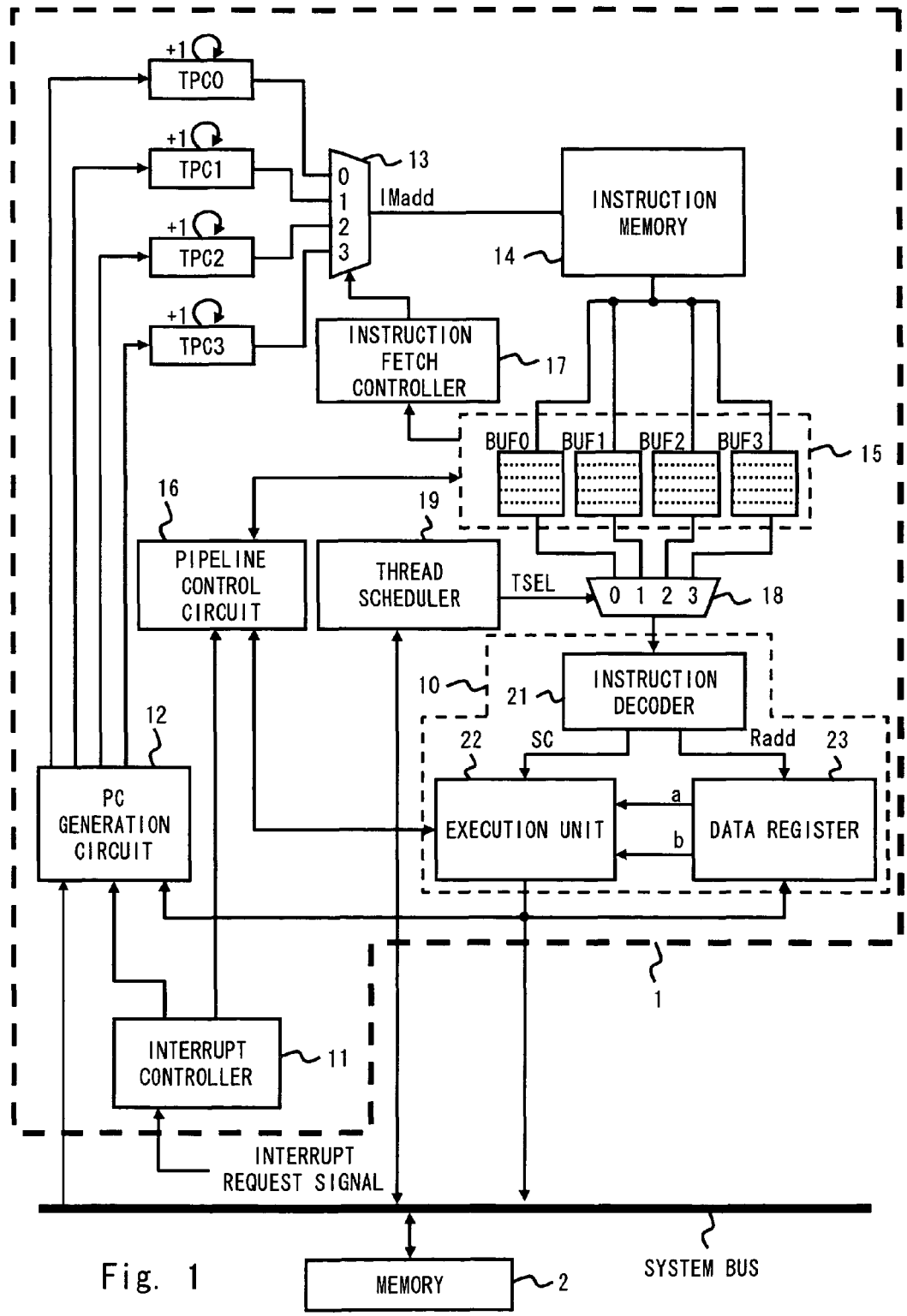
FIG. 1 is a block diagram of a multi-thread processor in accordance with a first exemplary embodiment of the present invention.

Exemplary embodiments of the present invention are explained hereinafter with reference to the drawings. FIG. 1 is a block diagram of a processor system including a multi-thread processor 1 in accordance with a first exemplary embodiment of the present invention. A multi-thread processor 1 is connected to a memory 2 through a system bus in a processor system in accordance with this exemplary embodiment. Note that though they are not shown in the figure, other circuits such as input/output interfaces are also connected to the system bus.

Firstly, a multi-thread processor 1 in accordance with this exemplary embodiment of the present invention is explained hereinafter. The multi-thread processor 1 includes a plurality of hardware threads. Note that the plurality of hardware threads are configured in one CPU. The hardware threads are composed of a group of circuits including thread program counters, an instruction memory, a general register, and a control register (it is assumed to be embedded in a pipeline control circuit 16 in this exemplary embodiment) and the like.

Note that the hardware thread is a system that generates an instruction flow composed of a series of instructions that are read out from an instruction memory in accordance with instruction fetch addresses output from a thread program counter embedded in the multi-thread processor 1. That is, instructions contained in an instruction flow generated by one hardware thread are highly relevant to each other. In this exemplary embodiment of the present invention, the multi-thread processor 1 has a plurality of thread program counters. The number of hardware threads is the same as the number of the thread program counters. Further details of the multi-thread processor 1 are explained hereinafter.

As shown in FIG. 1, the multi-thread processor 1 includes an execution pipeline 10, an interrupt controller 11, a PC generation circuit 12, thread program counters TPC0 to TPC3, selectors 13 and 18, an instruction memory 14, an instruction buffer 15, a pipeline control circuit 16, an instruction fetch controller 17, and a thread scheduler 19.

The execution pipeline 10 executes data processing based on an instruction generated by a hardware thread selected by the selector 18. More specifically, the execution pipeline 10 includes an instruction decoder 21, an execution unit 22, and a data register 23. The instruction decoder 21 decodes a received instruction and outputs an arithmetic control signal SC to the execution unit 22. Further, the instruction decoder 21 also outputs a data register address Radd indicating the storage location of data based on the decoding result of an instruction. The execution unit 22 performs various arithmetic operations according to the arithmetic control signal SC. Note that the execution unit 22 has a plurality of execution stages and performs arithmetic in pipeline processing.

Further, an arithmetic result of execution in the execution unit 22 is transmitted to the PC generation circuit 12, the memory 2, or the data register 23 according to the type of the arithmetic operation result. The data register 23 stores data used in the execution unit 22. Further, the data register 23 outputs data located at an address specified by a data register address Radd. In the example shown in FIG. 1, the data register 23 is configured in such a form that it outputs data "a" and data "b" according to the data register address Radd. Further, the data register 23 stores an arithmetic operation result output by the execution unit 22 at an address specified by the data register address Radd.

The interrupt controller 11 receives an interrupt request signal, and outputs an interrupt instruction signal instructing the execution of interrupt processing in the multi-thread processor 1. More specifically, upon receiving an interrupt request signal, the interrupt controller 11 determines the interrupt factor and the priority of the interrupt processing and the like, and instructs the PC generation circuit 12 and the pipeline control circuit 16 to execute interrupt processing so that they carry out processing relevant to that interrupt factor. The interrupt request is also output from other circuits in addition to the one output from the multi-thread processor 1.

The PC generation circuit 12 receives a new program instruction signal input through the system bus, an interrupt instruction signal output from the interrupt controller 11, and a branch instruction signal output based on processing on the execution unit 22, and generates a program count update value. Then, the PC generation circuit 12 provides the program count update value to one of the thread program counters TPC0 to TPC3. Note that the PC generation circuit 12 also has a function of determining which one of the thread program counters TPC0 to TPC3 the generated program count update value is provided to.

The thread program counters TPC0 to TPC3 generate an address in the instruction memory 14 at which an instruction to be processed is stored (hereinafter, this address is referred to as "instruction fetch address IMadd"). Further, when a program count update value is provided from the PC generation circuit 12 to the thread program counters TPC0 to TPC3, the thread program counters TPC0 to TPC3 update the instruction fetch address IMadd according to the program count update value. On the other hand, when no program count update value is input to the thread program counters TPC0 to TPC3, they calculate a next consecutive instruction fetch address by calculating the address in ascending order.

Note that although four thread program counters are shown in FIG. 1, the number of program thread counters may be determined arbitrarily according to the specifications of the multi-thread processor.

The selector 13 selects one of the thread program counters TPC0 to TPC3 according to a thread designation signal output from the instruction fetch controller, and outputs the instruction fetch address IMadd output from the selected thread program counter. Note that numerical signs 0 to 4 affixed to the input terminals of the selector 13 in FIG. 1 indicate hardware thread numbers.

The instruction memory 14 is a memory area shared by a plurality of hardware threads. Various instructions that are to be used in arithmetic operations performed in the multi-thread processor 1 are stored in the instruction memory 14. Furthermore, the instruction memory 14 outputs an instruction specified by an instruction fetch address IMadd input through the selector 13. At this point, the instruction memory 14 determines which one of the thread program counters TPC0 to TPC3 has output the instruction fetch address IMadd selected by the selector 13, and changes the output destination of the instruction based on the determination result.

In this exemplary embodiment of the present invention, the instruction buffer 15 includes instruction buffer areas BUF0 to BUF3 corresponding to the thread program counters TPC0 to TPC3. Therefore, the instruction memory 14 distributes the read instruction to one of the instruction buffer areas BUF0 to BUF3 according to the output source of the instruction fetch address IMadd. Note that the instruction memory 14 may be a predefined memory area contained in the memory 2. Further, the instruction buffer areas BUF0 to BUF3 are a FIFO (First In First Out) type buffer circuit. Furthermore, the instruction buffer areas BUF0 to BUF3 may be configured by dividing an area of one buffer, or may be formed in separated areas.

The pipeline control circuit 16 monitors an instruction stored at the top of the instruction buffer 15 and an instruction being executed in the execution unit 22. Further, when an interrupt instruction signal is input from the interrupt controller 11 to the pipeline control circuit 16, the pipeline control circuit 16 instructs the instruction buffer 15 and the execution unit 22 to discard the instruction that belongs to the hardware thread relating to the interrupt processing.

The instruction fetch controller 17 determines which hardware thread the instruction to be fetched belongs to according to the number of instructions stored in the instruction buffer 15, and outputs a thread designation signal based on the determination result. For example, when the number of instructions in the instruction queue stored in the instruction buffer area BUF0 is smaller than those stored in the other instruction buffer areas, the instruction fetch controller 17 determines that the instruction belonging to 0th hardware thread should be fetched and outputs a thread designation signal indicating the 0th hardware thread. Therefore, the selector 13 selects the thread program counter TPC0. Note that the instruction fetch controller 17 may determine a hardware thread to be selected by using procedure based on a round robin method.

The selector 18 is a selector that functions as a first selector. The selector 18 selects one of the instruction buffer areas BUF0 to BUF3 according to a thread selection signal TSEL output from the thread scheduler 19, and outputs an instruction read from the selected instruction buffer area to the execution pipeline 10. That is, the selector 18 selects one hardware thread from a plurality of hardware threads according to a thread selection signal TSEL, and outputs an instruction output from the selected hardware thread to the execution pipeline 10. Note that numerical signs 0 to 4 affixed to the input terminals of the selector 18 also indicate hardware thread numbers.

The thread scheduler 19 outputs a thread selection signal TSEL that specifies one hardware thread to be executed in the next execution cycle among a plurality of hardware threads according to a pre-established schedule. That is, the thread scheduler 19 manages in what order a plurality of hardware threads are processed with a schedule, and outputs the thread selection signal TSEL so that instructions generated by hardware threads are executed in the order according to that schedule. Note that when a mask signal MSK is input to the thread scheduler 19, the thread scheduler 19 avoids selecting a hardware thread indicated by the mask signal MSK. Note also that in a multi-thread processor 1 in accordance with this exemplary embodiment of the present invention, this schedule is established by a management program that is executed immediately after the multi-thread processor 1 is started up.

Figure 2:
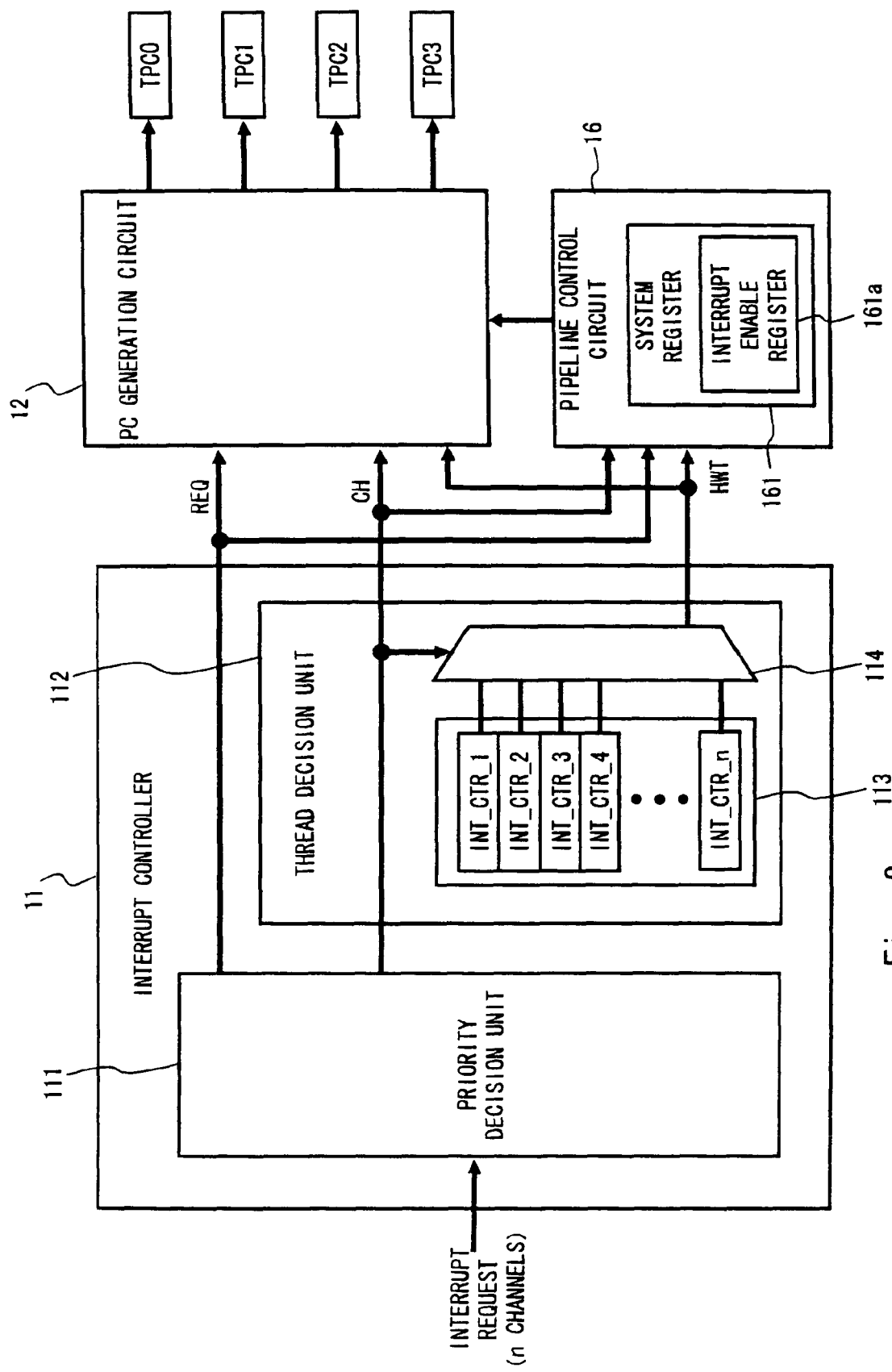
FIG. 2 is a detailed block diagram of an interrupt controller in accordance with a first exemplary embodiment of the present invention.

Next, details of the interrupt controller 11, the PC generation circuit 12, and the pipeline control circuit 16 are explained hereinafter with reference to FIG. 2. As shown in FIG. 2, the interrupt controller 11 includes a priority decision unit 111 and a thread decision unit 112. Note that the thread decision unit 112 includes a thread bind register 113 and a selector 114. Further, the pipeline control circuit 16 includes a system register 161 as mentioned above. Furthermore, the system register 161 includes an interrupt enable register 161a.

When two or more interrupt request signals overlapping each other in terms of time are input, the priority decision unit 111 determines the priorities of the interrupt request signals, and preferentially outputs an interrupt request signal with a higher priority. Note that the interrupt request signals in this exemplary embodiment of the present invention have n channels, and thus capable of handling n interrupt factors.

Figure 3:
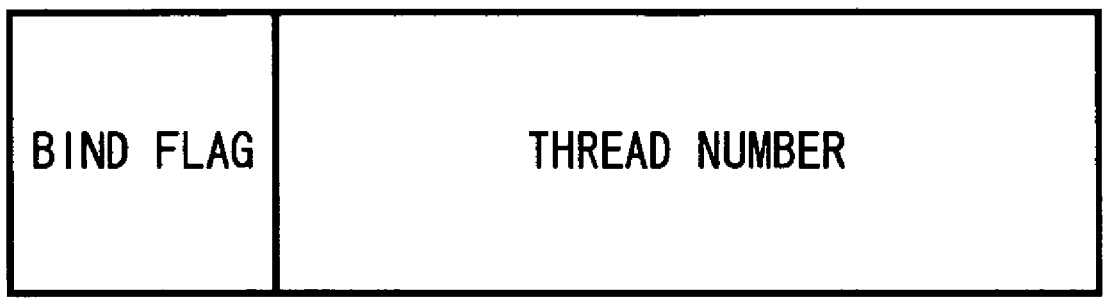
FIG. 3 is a schematic diagram illustrating a structure of a thread bind register corresponding to one channel in accordance with a first exemplary embodiment of the present invention.

The thread decision unit 112 determines the thread that should process an interrupt request based on channel information CH of that interrupt request. As explained above, the thread decision unit 112 includes the thread bind register 113 and the selector 114. For each channel of interrupt requests, a number assigned to a hardware thread that should process that particular interrupt request, i.e., a hardware thread number associated with that particular interrupt request is written into the thread bind register 113. In FIG. 2, registers for the respective channels are shown as "INT_CTR_1" to "INT_CTR_n". Each of these registers "INT_CTR_1" to "INT_CTR_n" for the respective channels are connected to the selector 114. The selector 114 outputs hardware thread information HWT of a hardware thread that should process an interrupt request to the PC generation circuit 12 and the pipeline control circuit 16 based on the channel information CH of that interrupt request signal Definition of a register for each channel in the thread bind register 113 in accordance with this exemplary embodiment of the present invention is explained hereinafter with reference to FIG. 3. As shown in FIG. 3, a bind flag and a hardware thread number have been written into a register for each channel (corresponding to one of "INT_CTR_1" to "INT_CTR_n" shown in FIG. 2). The bind flag indicates whether or not the interrupt request of that particular channel is associated with the written hardware thread number. Specifically, if the bind flag is 1, there is relevancy. Further, if the bind flag is 0, there is no relevancy. As the hardware thread number, one of the hardware thread numbers 0 to 3 has been written in this exemplary embodiment of the present invention. Note that if there is relevancy, the written hardware thread number is output as hardware thread information HWT. In this case, the PC generation circuit 12 generates a program count update value for the specified thread program counter TPC. On the other hand, if there is no relevancy, hardware thread information HWT indicating that situation is output. In this case, the PC generation circuit 12 generates a program count update value for any one of the thread program counters TPC0 to TPC3.

Next, operations are explained hereinafter with reference to FIG. 2. An interrupt request signal REQ input to the interrupt controller 11 is input to the PC generation circuit 12 and the pipeline control circuit 16 through the priority decision unit 111. Further, channel information CH based on the interrupt request signal is input to the thread decision unit 112. This channel information CH is input to the selector 114 located in the thread decision unit 112, and also is output to the PC generation circuit 12 and the pipeline control circuit 16. Then, as explained above, the selector 114 outputs the information HWT of a hardware thread that should process an interrupt request to the PC generation circuit 12 and the pipeline control circuit 16 based on the channel information CH of the interrupt request signal. Note that the above-mentioned three items, i.e., the interrupt request signal REQ, the channel information CH, and the hardware thread information HWT are contained in an interrupt instruction signal output from the interrupt controller 11 shown in FIG. 1.

Upon receiving these three signals, the PC generation circuit 12 refers to an interrupt enable register 161a in the system register 161 of the pipeline control circuit 16. Then, after acquiring an interrupt enable flag, it generates a program count update value for any one of the thread program counters TPC0 to TPC3 based on the interrupt request signal REQ, the channel information CH, and the hardware thread information HWT, and initiates the interrupt processing.

Figure 4:
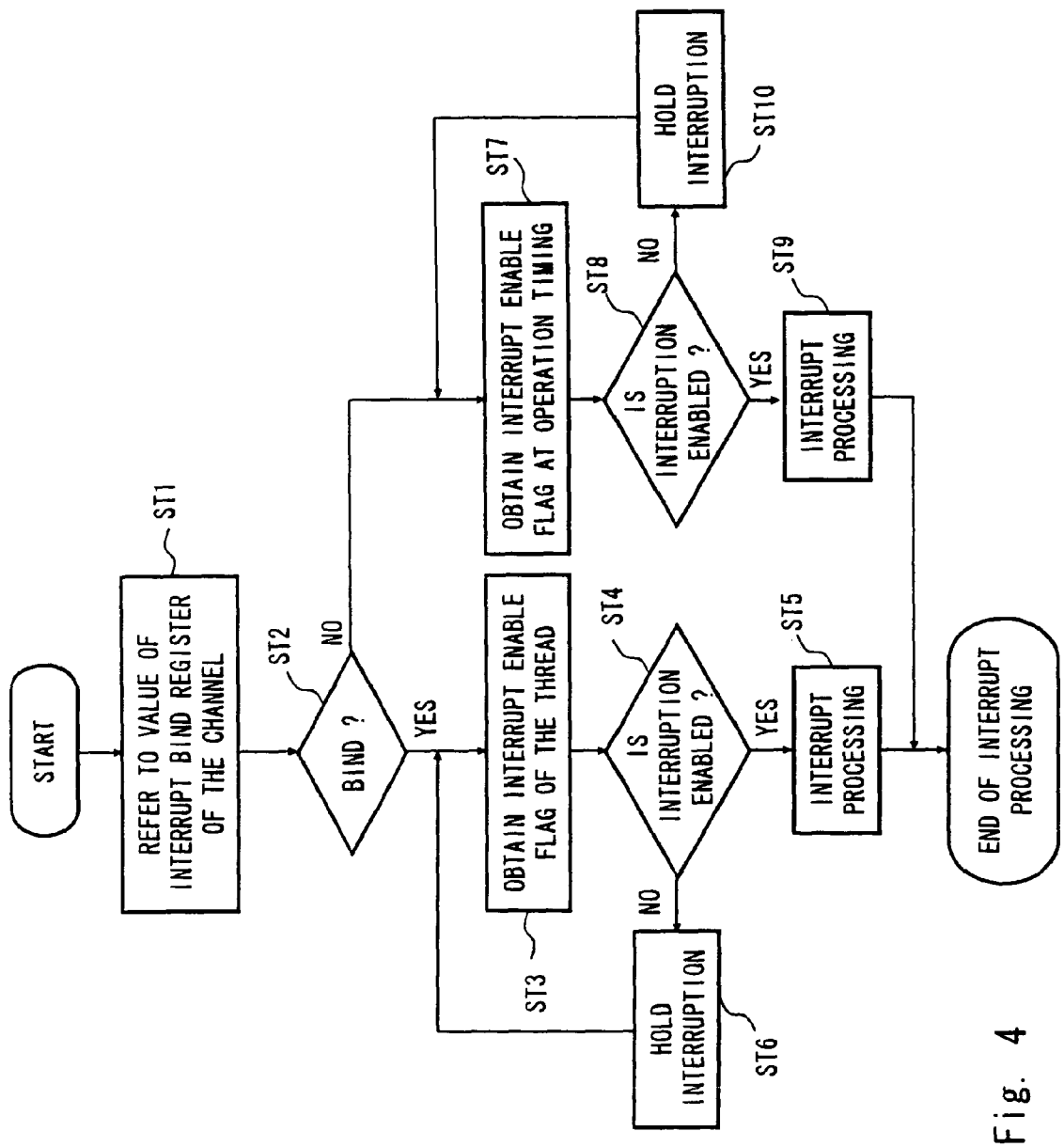
FIG. 4 is a flowchart showing procedure of interrupt processing in accordance with a first exemplary embodiment of the present invention.

Next, procedure of interrupt processing in accordance with this exemplary embodiment of the present invention is explained hereinafter with reference to a flowchart shown in FIG. 4. Firstly, when an interrupt request signal is input to the interrupt controller 11, the thread decision unit 112 refers to a value stored in a register of that particular channel among the thread bind registers 113 (ST1).

Next, the thread decision unit 112 determines whether or not the interrupt request is associated with a certain hardware thread, i.e., is bound to a certain hardware thread (ST2). If the interrupt request is associated with a certain hardware thread (YES at ST2), the PC generation circuit 12 obtains the interrupt enable flag of that hardware thread (ST3). Next, if the interruption is enabled (YES at ST4), the PC generation circuit 12 outputs a program count update value and executes interrupt processing (ST5). In this way, the interrupt processing is completed. On the other hand, if the interruption is disabled (NO at ST4), the PC generation circuit 12 puts the interrupt processing in a hold state (ST6) and obtains the interrupt enable flag again (ST3).

Meanwhile, if the interrupt request is not associated with any hardware thread (NO at ST2), the interrupt request may be processed by any one of the hardware threads. Therefore, the interrupt enable flag of a hardware thread that is running at the time when the interrupt request is received is obtained (ST7). Next, if the interruption is enabled (YES at ST8), the PC generation circuit 12 outputs a program count update value and executes interrupt processing (ST9). In this way, the interrupt processing is completed. On the other hand, if the interruption is disabled (NO at ST8), the PC generation circuit 12 puts the interrupt processing in a hold state (ST10) and obtains the interrupt enable flag again (ST7).

Next, advantageous effects of the present invention are explained with reference to FIGS. 5 and 6. Firstly, FIG. 6 is a diagram for explaining interrupt processing in accordance with a comparative example. As shown in FIG. 6 as an example, assume that schedules of the CPU occupation time for a hardware thread 0, a hardware thread 1, a hardware thread 2, and a hardware thread 3 are 50%, 35%, 10%, and 5%, respectively, of the total time. Assume also a case where interrupt processing occurs at timing indicated by the dotted lines, and 20% of the total time have been used for the interrupt processing. A hatched portion in each hardware thread indicates an interrupt processing time. In the case of the comparative example, the CPU effective occupation time is reduced by 20% uniformly in any of the hardware threads. Specifically, the CPU effective occupation times for the hardware thread 0, the hardware thread 1, the hardware thread 2, and the hardware thread 3 become 40%, 28%, 8%, and 4% respectively.

As described above, in the comparative example, an interrupt request that does not requires strict time management may be assigned to a predefined hardware thread that executes processing requiring strict time management. Therefore, it could have a fatal adverse effect on other processing that requires strict time management, and the overall reliability of the system could be impaired. Further, since interrupt information is not associated with a hardware thread, an interrupt request requiring strict time management, for example, might not be assigned to a predefined hardware thread that executes processing requiring strict time management, and therefore the overall reliability of the system could be impaired.

Figure 5:
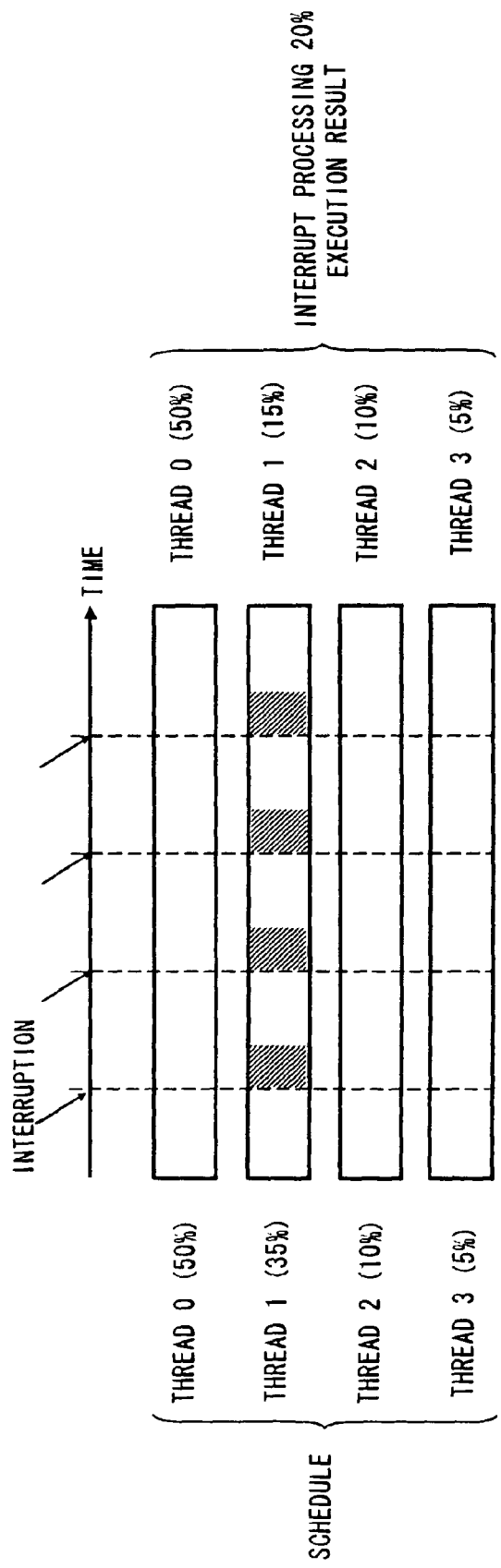
FIG. 5 is a diagram for explaining interrupt processing in accordance with a first exemplary embodiment of the present invention.
Figure 6:
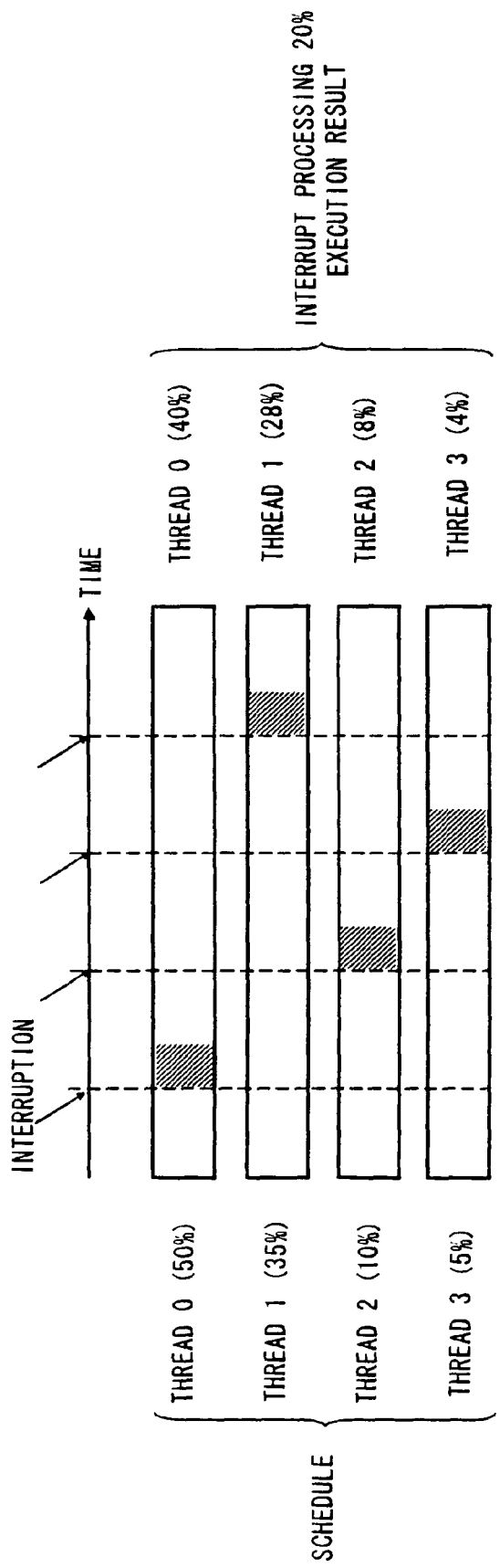
FIG. 6 is a diagram for explaining interrupt processing in accordance with a comparative example.

FIG. 5 is a diagram for explaining interrupt processing in accordance with a first exemplary embodiment of the present invention. In FIG. 5, a situation where an interrupt request associated with the hardware thread 1 is processed is shown. In this case, the CPU effective occupation time is reduced by 20% in the hardware thread 1. Specifically, the CPU effective occupation times for the hardware thread 0, the hardware thread 1, the hardware thread 2, and the hardware thread 3 become 50%, 15%, 10%, and 5% respectively.

As described above, in this exemplary embodiment of the present invention, since interrupt information is associated with a hardware thread, an interrupt request requiring strict time management, for example, can be always assigned to a predefined hardware thread that executes processing requiring strict time management, and therefore the overall reliability of the system is ensured. Further, any interrupt request that does not require strict time management is not assigned to a predefined hardware thread that executes processing requiring strict time management. Further, the independence of each hardware thread in interrupt processing is increased, and thus making the system designing easier. Furthermore, by assigning interruptions that are less important but occur frequently to a dedicated hardware thread, it is possible to cope with them without deteriorating the overall performance of the system.

[Second Exemplary Embodiment]

Next, a second exemplary embodiment of the present invention is explained hereinafter with reference to FIG. 7. FIG. 7 is definition of a register for each channel (corresponding to one of "INT_CTR_1" to "INT_CTR_n" shown in FIG. 2). That is, it corresponds to FIG. 3 in a first exemplary embodiment of the present invention. Other configurations are similar, and therefore their explanation is omitted. In a second exemplary embodiment of the present invention, a flag is provided for each of the four hardware threads 0 to 3.

In a second exemplary embodiment of the present invention, one interrupt request can be associated with two or more hardware threads. For example, when the flags of the hardware threads 0 and 1 are set to 0 and the flags of the hardware threads 2 and 3 are set to 1 for an interrupt request of a certain channel, this interruption is processed by one or both of the hardware threads 2 and 3. Further, it becomes also possible to process an interrupt request of a certain channel by using all but a specific hardware thread. Note that if the flags of all the hardware threads are set to 1, the interrupt request can be processed by any of the hardware threads, and therefore the process is similar to a case of a first exemplary embodiment in which the bind flag is set to 0.

Note that the present invention is not limited to above-described exemplary embodiments, and they can be modified without departing from the spirit of the present invention. Further, note also that in the above explanation, some of descriptions and figures are simplified as appropriate for clarifying the explanation.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A multi-thread processor comprising:
   a plurality of hardware threads each of which generates an independent instruction flow; and
   an interrupt controller that determines whether or not an input interrupt request signal is associated with and bound to one or more certain hardware threads of the plurality of hardware threads, and when the input interrupt request signal is determined to be associated with and bound to one or more certain hardware threads, the interrupt controller assigns an interrupt request signal to an associated hardware thread.

2. The multi-thread processor according to claim 1, wherein the interrupt request signal comprises a plurality of channels, and
   wherein the interrupt controller comprises a register in which information about a relation, with one or more hardware thread is stored for each channel of the interrupt request signal.

3. The multi-thread processor according to claim 1, further comprising an execution pipeline that executes data processing based on an instruction flow generated by the plurality of hardware threads.

4. The multi-thread processor according to claim 1, wherein the multi-thread processor further comprises a PC generation circuit which generates a program count update value for the plurality of hardware threads.

5. The multi-thread processor according to claim 1, wherein the input interrupt request signal is one of a plurality of input interrupt request signals, and
   wherein the interrupt controller comprises:
      a priority decision unit that determines priorities of the plurality of input interrupt request signals, and outputs an interrupt request signal having a higher priority before outputting an interrupt request signal having a lower priority.

6. The multi-thread processor according to claim 2, wherein the register for each channel of the interrupt request signal stores information about the relation between any one of the plurality of hardware threads and the interrupt request signal of that channel.

7. The multi-thread processor according to claim 2, wherein the register for each channel of the interrupt request signal stores information about the relation between all hardware threads of the plurality of hardware threads and the interrupt request signal of that channel.

8. The multi-thread processor according to claim 2, wherein the interrupt controller further comprises a selector connected to the register for each channel of the interrupt request signal, the selector being configured to select, based on a channel of the input interrupt request signal, information stored in a register of that channel.

9. The multi-thread processor according to claim 2, wherein the interrupt controller further comprises a priority decision unit that determines priorities of a plurality of interrupt request signals, and the plurality of interrupt request signals includes the interrupt request signal.

10. The multi-thread processor according to claim 3, wherein the execution pipeline comprises an execution unit that transmits data to a PC generation circuit of the multi-thread processor, and
wherein the interrupt controller outputs the interrupt request signal to the PC generation circuit to execute an interrupt processing.

11. The multi-thread processor according to claim 5, wherein the interrupt controller further comprises a thread decision unit that determines which of the hardware threads should process the input interrupt request signal.

12. The multi-thread processor according to claim 11, wherein the thread decision unit comprises a thread bind register that stores a hardware thread number, which is associated with one of the plurality of input request signals.

13. The multi-thread processor according to claim 11, wherein the multi-thread processor further comprises a PC generation circuit which generates a program count update value for the plurality of hardware threads, and
wherein the PC generation circuit receives an output of the priority decision unit and an output of the thread decision unit.

14. An interrupt processing method of a multi-thread processor having a plurality of hardware threads, the interrupt processing method comprising:
determining whether or not an input interrupt request signal is associated with and, bound to one or more certain hardware threads of the plurality of hardware threads, and when the input interrupt request signal is determined to be associated with and bound to one or more certain hardware thread of the plurality of hardware threads, assigning an interrupt request signal to an associated hardware thread.

* * * * *